US008797899B2

(12) United States Patent
Ruuska (10) Patent No.: US 8,797,899 B2
(45) Date of Patent: Aug. 5, 2014

(54) SYSTEM AND METHOD FOR PROBABILISTIC WLAN POSITIONING (75) Inventor: Vesa V. Ruuska, Kangasala (FI)

(73) Assignee: Qualcomm Incorporated, San Diego, CA (US)

(*) Notice: Subject to any disclaimer, the term of this patent is extended or adjusted under 35 U.S.C. 154(b) by 149 days.

(21) Appl. No.: 13/335,752

(22) Filed: Dec. 22, 2011

(65) Prior Publication Data

US 2013/0163448 A1 Jun. 27, 2013

(51) Int. Cl.
G01R 31/08 (2006.01)
G06F 11/00 (2006.01)
G08C 15/00 (2006.01)
H04J 1/16 (2006.01)
H04J 3/14 (2006.01)
H04L 1/00 (2006.01)
H04L 12/26 (2006.01)

(52) U.S. Cl.
USPC ........ 370/252; 370/338; 455/456; 455/456.1; 455/456.5; 455/404.1; 455/67.11

(58) Field of Classification Search
USPC ....................................................... 370/252
See application file for complete search history.

(56) References Cited

U.S. PATENT DOCUMENTS

| 6,249,252 B1* | 6/2001 | Dupray ........................ 342/450 |
| 2007/0001867 A1* | 1/2007 | Rowe et al. ............. 340/825.49 |
| 2007/0121560 A1* | 5/2007 | Edge ............................. 370/338 |
| 2009/0074038 A1* | 3/2009 | Lentmaier et al. ............ 375/148 |
| 2009/0216847 A1* | 8/2009 | Krishnaswamy et al. .... 709/206 |
| 2010/0117898 A1* | 5/2010 | Wigren .................... 342/357.09 |
| 2010/0121615 A1* | 5/2010 | Cunningham ................... 703/2 |
| 2011/0319100 A1* | 12/2011 | Flanagan .................. 455/456.5 |

FOREIGN PATENT DOCUMENTS

EP 0825418 A2 2/1998

OTHER PUBLICATIONS

International Search Report and Written Opinion—PCT/US2012/070118—ISA/EPO—Mar. 28, 2013.

* cited by examiner

Primary Examiner — Faruk Hamza
Assistant Examiner — Shah R Zaman
(74) Attorney, Agent, or Firm — Bay Area Technology Law Group PC (57) ABSTRACT This disclosure is directed to a wireless network node having position determination capabilities. The position of a node is determined using range measurements to other network nodes having known locations. Probability density functions modeling uncertainty factors are incorporated in the estimation algorithms to account for the dynamic nature of wireless network, including the relative motion of a node in the network. These probabilistic estimation techniques provide a solution in the form of an expectation value for the position of the network node and a variance that can be assessed to determine the validity of the position determination.

20 Claims, 3 Drawing Sheets

SYSTEM AND METHOD FOR PROBABILISTIC WLAN POSITIONING

FIELD OF THE PRESENT INVENTION

This disclosure generally relates to positioning systems and more specifically to systems and methods for providing a wireless network capable of making positioning determinations for nodes on the basis of probability densities.

BACKGROUND OF THE INVENTION

Widespread adoption of wireless communication standards has led to a proliferation of networks. Notable examples include systems based on the IEEE 802.11 protocols. With this growth, there has been a concurrent increase in the functionality provided by such networks. A particularly desirable feature is the ability to make positioning determinations for nodes within the network by analyzing the transmissions between the nodes. The benefits associated with such a capability are numerous.

One important application relates to the tracking of assets or people. By providing an entity with a transceiver in communication with the wireless network, its position can be determined rapidly. With regard to assets, knowledge of current position facilitates utilization of the asset, streamlines logistics and helps prevent loss. With regard to persons, management and oversight can be significantly improved.

Another application currently receiving considerable attention is Location-Based Services (LBS). With the availability of position information for mobile clients, the user of such a device can receive information specifically tailored to the user's current location. As will be appreciated, the benefits associated with this feature extend to multiple situations, including recreation, commercial and work environments.

In view of the desirability of providing network nodes having position determination capabilities, a number of strategies have been employed to perform the necessary determinations. Many of the location techniques used in wireless networks are based on electromagnetic analyses of the characteristics of communications between nodes of the network. For example, received signal strength indication (RSSI), time-of-arrival (TOA), time-difference-of-arrival (TDOA) and round trip time (RTT) can all be used to make estimations of the distance between participating nodes. With sufficient numbers of distance estimations between a node with unknown position and nodes having known position, range-based location determinations such as trilateration are possible. Alternatively, angle-of arrival (AOA) can also be used with suitable triangulation algorithms to make position determinations, but such techniques typically require use of an antenna array to obtain the necessary signal angle information.

To obtain the benefits of making position determinations for network nodes in a wireless network, a number of challenges must be met. In one important aspect, the distance estimations used for range-based solutions require are subject to uncertainties resulting from many of the same noise and interference issues that effect wireless communication in general. For example, multipath distortion affecting the wireless channel may lead to distance estimates that do not correspond to the straight line path between the nodes. As will be appreciated, multipath propagation errors are typically exacerbated in indoor environments due to the many reflecting surfaces.

Accordingly, position determination in a wireless network environment requires robust strategies for managing noise and interference so that useful estimations can be made. Conventional methods for dealing with noise and interference include the use of data fitting algorithms such as a least squares-based analysis. Under these approaches, position determinations can often be improved by mitigating noise using filtering techniques including the use of Kalman filters and the like. In general, these methods provide relatively good position determinations when ample, high quality measurements are available.

The above noted conventional approaches are less successful, however, when only more sporadic measurements are available. In many practical situations, then, there may be an insufficient number of range measurements to obtain reliable position determinations. Further, relative motion between the network nodes also significantly undermines the ability of conventional techniques to provide sufficiently accurate position determinations. In addition to the noise imparted by motion, movement of one or more nodes may also render older measurements unusable.

As a result, it would be desirable to provide position determination for wireless networks even when relatively few measurements are available. Moreover, it would be desirable to provide such position determination using measurements taken at different times, even when relative motion between nodes may occur. Yet further, it would be desirable to provide such position determination so that the quality of the determination may be easily assessed. It would also be desirable to reduce the filtering necessary to obtain position determinations. This invention accomplishes these and other goals.

SUMMARY OF THE INVENTION

In accordance with the above needs and those that will be mentioned and will become apparent below, this disclosure is directed to a method for making a position determination for a first node within a wireless network including by obtaining position information for a plurality of known network nodes, obtaining range measurements for distances between the first node and the plurality of known network nodes, determining a single range measurement probability density function for a position of the first network node for each of the range measurements, determining a combined probability density function by taking the product of the singe range measurement probability density functions, and determining an expectation value corresponding to the first network node's position and a variance of the expectation value by integrating with respect to the combined probability density function.

In one aspect, the single range measurement probability density functions model an uncertainty factor including process noise, known network node location or range measurement. Preferably, the single range measurement probability density functions model uncertainty factors for both process noise and known network node location. Also preferably, the probability density functions are Gaussian distributions.

In one embodiment, integrating with respect to the combined probability density function includes performing a lattice point integration. Alternatively, integrating with respect to the combined probability density function includes performing a Gauss-Hermite quadrature calculation.

Another aspect of the disclosure is directed to also assessing the variance of the expectation value to determine the validity of the position determination for the first network node. Yet another aspect is directed to obtaining range measurements for distances between the first node and the plurality of known network nodes by performing a round trip time calculation. Preferably, obtaining range measurements may also include taking at least one non-simultaneous measurement. A further aspect includes supplementing the position determination with position information from an independent source.

This disclosure is also directed to a wireless network having position determination capabilities, wherein the network includes a first network node, a plurality network nodes having known location and a probabilistic positioning engine configured to obtain position information for the plurality of known network nodes, obtain range measurements for distances between the first node and the plurality of known network nodes, determine a single range measurement probability density function for a position of the first network node for each of the range measurements, determine a combined probability density function by taking the product of the single range measurement probability density functions, and make a position determination comprising an expectation value corresponding to the first network node's position and a variance of the expectation value by integrating with respect to the combined probability density function.

Preferably, the probabilistic positioning engine is configured to determine a single range measurement probability density function for a position of the first network node for each of the range measurements by modeling an uncertainty factor including process noise, known network node location and range measurement. More preferably, the single range measurement probability density function models uncertainty factors for both process noise and known network node location. Further, such probability density functions are preferably Gaussian distributions.

In one aspect, the probabilistic positioning engine is configured to integrate with respect to the combined probability density function by performing a lattice point integration. Alternatively, the probabilistic positioning engine is configured to integrate with respect to the combined probability density function by performing a Gauss-Hermite quadrature calculation.

In another aspect of the disclosure, the probabilistic positioning engine also assesses the variance of the expectation value to determine the validity of the position determination for the first network node.

A further aspect involves configuring the probabilistic positioning engine to obtain range measurements for distances between the first node and the plurality of known network nodes by performing a round trip time calculation. Preferably, the probabilistic positioning engine may also be configured to obtain range measurements for distances between the first node and the plurality of known network nodes by taking at least one non-simultaneous measurement.

Yet another aspect of the disclosure is directed to configuring the probabilistic positioning engine to supplement the position determination resulting from the integration of the combined range measurement probability density functions with position information from an independent source.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which.

DETAILED DESCRIPTION OF THE INVENTION

At the outset, it is to be understood that this disclosure is not limited to particularly exemplified materials, architectures, routines, methods or structures as such may, of course, vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), and flash memory or any other medium that can be used to store the desired information.

As used herein, the terms "location" and "position" may be used interchangeably and in general refer to the physical manifestation of a network node with reference to a suitable coordinate system in two or three dimensional space, depending upon the application. Accordingly, the terms "location information" and "position information" generally refer to any data indicating such location or position. Finally, the terms "known position" and "known location" generally refer to a network node for which sufficient position information of adequate validity is available to allow its use in the position determinations of the disclosure. The position information of a network node having a known location may be derived from any suitable source, including without limitation the probabilistic position determinations that are the subject of this disclosure, any of the conventional wireless positioning techniques described above, site surveys, manual input, and external positioning systems such as satellite-based navigation systems.

Further, embodiments are discussed in specific reference to wireless networks. As such, this disclosure is applicable to any suitable wireless network having the necessary characteristics, including wireless local area networks (WLAN), particularly those governed by IEEE 802.11 protocols, as well as wireless fidelity (WiFi), Wibree™, ultra wideband (UWB), Long Term Evolution (LTE), Enhanced Data for GSM Evolution (EDGE), Evolution Data Optimized (EVDO), General Packet Radio Service (GPRS) networks and others.

In the figures, a single block may be described as performing a function or functions; however, in actual practice, the function or functions performed by that block may be performed in a single component or across multiple components, and/or may be performed using hardware, using software, or using a combination of hardware and software. Also, the exemplary wireless network devices may include components other than those shown, including well-known components such as a processor, memory and the like.

Unless defined otherwise, all technical and scientific terms used herein have the same meaning as commonly understood by one having ordinary skill in the art to which the disclosure pertains.

Further, all publications, patents and patent applications cited herein, whether supra or infra, are hereby incorporated by reference in their entirety.

Finally, as used in this specification and the appended claims, the singular forms "a, "an" and "the" include plural referents unless the content clearly dictates otherwise.

As noted above, this disclosure is directed to systems and methods for providing position determination in a wireless network using estimations incorporating probability densities. The position of a network node may be determined using range measurements to other network nodes having known locations. Incorporating probability functions in the estimation algorithms may help account for the dynamic nature of wireless networks, including the relative motion of a node in the network. In so doing, the techniques of this disclosure may reduce or avoid the need for filtering.

Further, the use of probability functions allows the return of a solution even when the problem is underdetermined, such as when relatively few range measurements are available. For example, a minimum of four measurements may be required to perform a conventional lateration-based position determination yielding a solution in three dimensions. As discussed above, conventional techniques, such as those based on least squares estimations, may be unsuitable when only a few measurements are available. In contrast, by using the estimation techniques of this disclosure, a solution in the form of a probability density function may be obtained even when the problem is underdetermined. Further, the solution may be more easily assessed for validity.

The incorporation of user dynamics in the estimation algorithm also permits the use of non-simultaneous measurements, so that prior measurements may still be employed in the positioning determination to supplement any current measurements.

Thus, the solutions to position determinations using the techniques of this disclosure preferably may be returned in the form of a probability density function. A probability density function may be determined for each available range measurement. Preferably, the probability density function is configured to compensate for uncertainty factors in the information used to make the position determination, including motion of the network node, errors in the location information for the known network nodes used in the range measurements, and errors in the range measurements themselves. As such, the solutions may include an average, or expectation value, corresponding to the most likely position of the network node together with a variance. The quality and number of measurements used, together with the geometry of the nodes involved in the determination may affect the variance. Accordingly, when the variance is sufficiently low, the position determination may be taken as a good fix and used for any suitable purpose. Similarly, when the variance is too high, it may be determined that the position fix is not sufficiently reliable.

These and other aspects of the disclosure are discussed in detail below with specific reference to exemplary embodiments.

Figure 1:
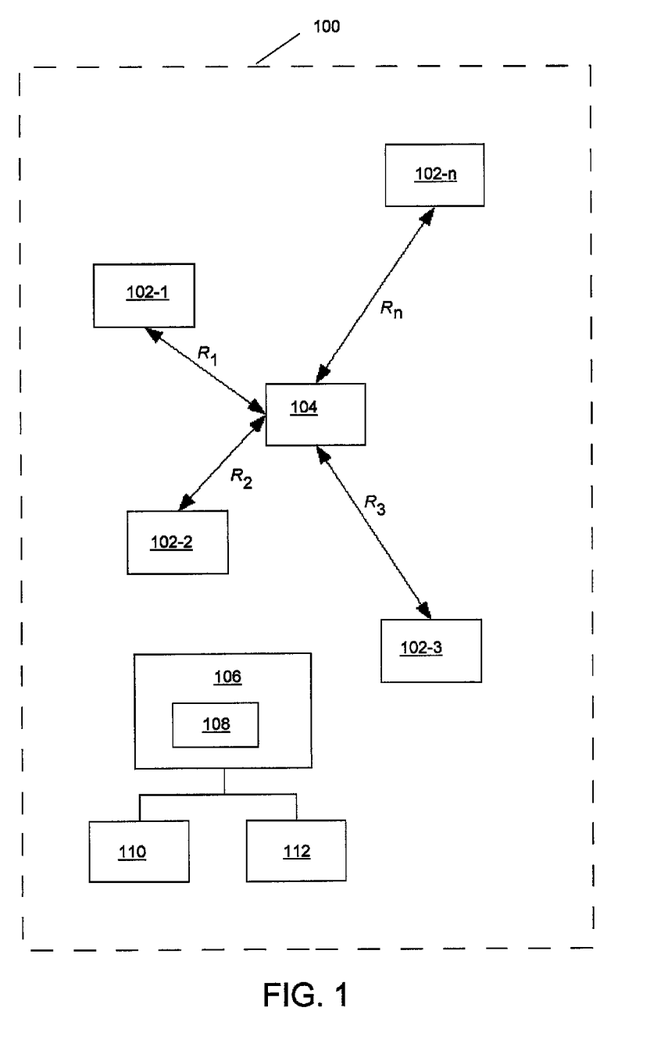
FIG. 1 is a schematic representation of a wireless network embodying aspects of the invention.

As shown in FIG. 1, a wireless network 100 embodying aspects of this disclosure generally includes various nodes, such as a plurality of access points 102-1, 102-2, 102-3-102-$n$ and client device 104. Here, the range between client device 104 and access point 102-1 is shown as distance $R_1$, the range between client device 104 and access point 102-2 is shown as distance $R_2$ the range between client device 104 and access point 102-3 is shown as distance $R_3$, and the range between client device 104 and access point 102-$n$ is shown as distance $R_n$. In this depiction, each access point 102 is in wireless communication with client device 104, but in typical applications, the network will be significantly larger and may include different types of nodes, not all of which may be within range of each other.

For the purposes of this embodiment, the locations of access points 102 are known to a sufficient degree of accuracy to permit their use in range-based position determinations. The position of client device 104 is unknown and an estimation of its position may be made using the probabilistic techniques of this disclosure. As will be appreciated, the availability of location information for the network nodes may vary depending upon circumstances, but in general, nodes having known locations may be used to determine the position of nodes with unknown locations. In a different embodiment, for example, the position of client device 104 may be known and may be used to determine the position of an access point 102 having an unknown location.

A position server 106 is connected to the network 100, either through a wired connection, such as Ethernet, or wirelessly. In the embodiment shown, position server 106 includes a probabilistic positioning engine 108 that is configured to obtain information from network 100 regarding the characteristics of communications between access points 102 and client device 104. Although depicted as a separate device, the functions of position server 106 can also be implemented within one of the access points 102 or client device 104, as desired.

Probabilistic positioning engine 108 also preferably maintains a database of position information for network 100. This includes position determinations made with regard to client device 104 as well as known positions for relatively static nodes, such as access points 102. As desired, probabilistic positioning engine 108 may also be configured to combine a current position determination with a previous position determination performed by probabilistic positioning engine 108 or with an independent supplemental source of position information to refine the location estimation. As shown in FIG. 1, suitable sources of supplemental position information may include position determinations obtained from a conventional positioning engine 110 or position information from external position source 112. In one embodiment, external position source 112 may be a global navigation satellite system (GNSS) receiver associated with one of the network nodes.

Figure 2:
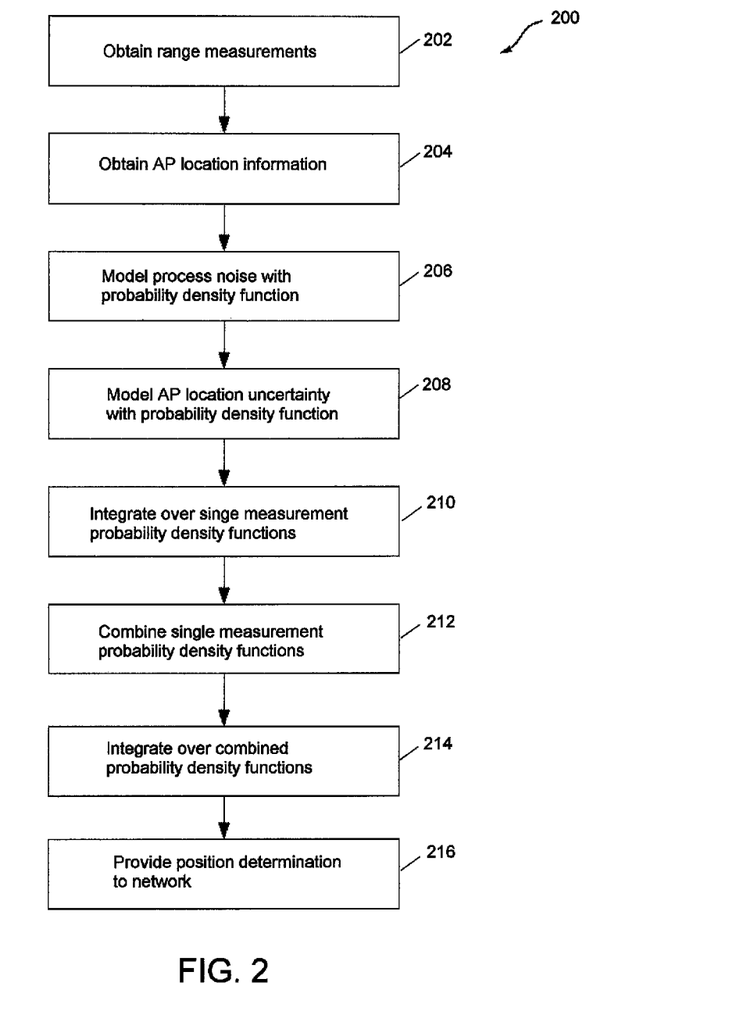
FIG. 2 is a flow chart showing the primary steps of a probabilistic positioning algorithm, according to the invention.

Accordingly, one embodiment of the disclosure incorporates the probabilistic positioning algorithm represented by the flowchart in FIG. 2 to make a position determination regarding client device 104. Depending upon the desired application, this procedure can be adapted to either two or three dimensions as desired.

Starting with step 202, available range measurements, distance R, regarding client device 104 are sent from network 100 to probabilistic positioning engine 108. Depending upon the application, the range measurements may be the actual distances or they may take the form of timing measurements from which the distance may be calculated by probabilistic positioning engine 108, for example. As discussed in detail below, a currently preferred source of range measurements is RTT, but any suitable source of range measurement may be employed. In step 204, position information, location a, regarding any of the access points 102 used in the range measurements is obtained from position server 106. Since the range measurements may be simultaneous or non-simultaneous, each measurement has an associated time delay t, corresponding to the age of the measurement.

Next, in step 206, an uncertainty factor corresponding to process noise is modeled using a probability distribution. Process noise reflects relative motion of client device 104 with respect to the known locations of access points 102 and can be viewed as the possible potential locations x of client device 104 after having moved over the course of time t from a starting location y. Preferably, a stochastic model is used, so that no knowledge regarding future motion of client device 104 is assumed. In a currently preferred embodiment, motion of client device 104 is modeled with Brownian dynamics, resulting in a Gaussian probability distribution having a variance of $\sigma_u^2$ as discussed below. In alternative embodiments, other suitable probability distributions may be chosen as desired based on anticipated conditions.

Further, access point 102 location a may not be accurately known, either due to errors in whatever technique was used to determine the location or other circumstances. Accordingly, in step 208, an uncertainty factor regarding access point 102 location a is also preferably modeled using a probability distribution. In a currently preferred embodiment, such errors are modeled with a Gaussian distribution having a variance of $\sigma_a^2$. In alternative embodiments, other suitable probability distributions may be chosen as desired based on anticipated conditions.

In some embodiments, it may also be desirable to provide a probability distribution for additional uncertainty factors, such as a probability distribution that models errors in range measurements R. In such embodiments, any suitable probability distribution may be chosen as desired based on anticipated conditions.

Next, in step 210, an integration over the probability distributions, including those from steps 206 and 208, are taken to calculate the single range measurement probability density functions p(a, R, $\sigma_u^2$, sigma; x, t) as described below. Then, the multiple range measurements are combined in step 212 by multiplication of the single range measurement probability density functions to get the a combined probability density function p(x), as also described below.

Then, in step 214, an integration with respect to the combined probability density function is performed to calculate the expected position pos of the client device 104 and the variance var, which reflects the uncertainty of the position determination and may be used to assess the quality of the fix. In one currently preferred embodiment, the combined probability density function is integrated over a bounded volume around access points 102 using a lattice point integration. Alternatively, the combined probability density function is integrated use Gauss-Hermite quadrature. Each aspect is described in detail below. However, other suitable techniques for calculating the integrals may be employed as desired.

Following calculation of the expected position and variance of client device 104, the position information may be delivered to network 100 in step 216 to be used for any suitable purpose. For example, information sent to client device 104 over network 100 may be tailored to reflect the position of client device 104 as part of a LBS application. Alternatively, the position of client device 104 may be registered and stored by position server 106 to facilitate tracking. The position of client device 104 may also be reported to the user of the device for navigational or other purposes. In one aspect, the quality of the position determination can be assessed on the basis of the variance to identify whether the estimation is sufficiently valid for its intended purpose.

As referenced above, a currently preferred model of the process noise uncertainty factor is a Gaussian distribution that reflects Brownian dynamics. As known to those of skill in the art, Brownian motion is used to describe the random motion of particles in a media and has been successfully used to model a number of real world situations. To facilitate the calculations, the following probability distribution models include isotropic diffusion. However, different probability distribution models employing other diffusion characteristics may be substituted as desired according to the intended application.

The Gaussian distribution modeling the movement of client device 104 is given by the probability density function:

$$\mathcal{N}(y \cdot \sigma_u^2 t ; x) = \frac{1}{\sqrt{2\pi\sigma_u^2 t}^3} e^{\frac{(x-y)^2}{2\sigma_u^2 t}}. \quad (1)$$

wherein the starting location of client device 104 is point y and point x is the location of client device 104 after time t, with a variance of $\sigma_u^2$.

A range measurement from network 100 as described with respect to step 202 is the distance R to access point 102 at the point a having a time delay t. Accordingly, after time t, the location of the user is described by the probability density $$p(a, R, \sigma_u; x, t) = \frac{1}{\sqrt{2\pi\sigma_u^2 t}^3} \int_{S^2(a,R)} e^{-\frac{(x-y)^2}{2\sigma_u^2 t}} \frac{d y}{4\pi R^2} = \tag{2}$$

$$\frac{1}{4\pi R \|x-a\| \sqrt{2\pi\sigma_u^2 t}} \left( e^{-\frac{(\|x-a\|-R)^2}{2\sigma_u^2 t}} - e^{-\frac{(\|x-a\|+R)^2}{2\sigma_u^2 t}} \right).$$

As discussed above regarding step 208, a probability density function is also preferably used to model the uncertainty factor corresponding to errors in the locations of access points 102. In this embodiment, a Gaussian distribution is used to model these errors, again assuming isotropic diffusion, such that location a for access point 102 is the mean and there is a variance of $\sigma_a^2$. As indicated in step 210, performing another integration of equation (1) incorporating this Gaussian density yields the single range measurement probability density:

$$p(a, R, \sigma_u, \sigma_a : x, t) = \frac{1}{\sqrt{2\pi\sigma_a^2}^3} \int_{R^3} e^{-\frac{(y-a)^2}{2\sigma_a^2}} p(y, R, \sigma_u; x, t) d y = \tag{3}$$

$$\frac{1}{4\pi R \|x-a\| \sqrt{2\pi s_a}} \left( e^{-\frac{(\|x-a\|-R)^2}{2s_a}} - e^{-\frac{(\|x-a\|+R)^2}{2s_a}} \right) =$$

$$e^{-R^2/2s_a} \frac{1}{\sqrt{2\pi s_a}^3} e^{-\frac{(x-a)^2}{2s_a}} \frac{\sinh(R\|x-a\|/s_a)}{R\|x-a\|/s_a} =$$

$$e^{-R^2/2s_a} \mathcal{N}(a, s_a; x) \frac{\sinh(R\|x-a\|/s_a)}{R\|x-a\|/s_a}$$

wherein the combined variance $s_a = \sigma_u^2 t + \sigma_a^2$ reflects both process noise and access point location uncertainty.

Next, with respect to step 212, multiple range measurements $(a, R_a)$ having different ages, $t_a$, may be combined as the product of each single range measurement probability function, leading to the following equation, representing the combined, non-normalized probability density that estimates the position of client device 104:

$$p(x) = \prod_a p(a, R_a, \sigma_u, \sigma_a; x, t_a) = \tag{4}$$

$$\prod_a e^{-R_a^2/2s_a} \mathcal{N}(a, s_a; x) \frac{\sinh(R_a \|x-a\|/s_a)}{R_a \|x-a\|/s_a} \propto$$

$$\mathcal{N}(\langle a \rangle, s; x) \prod_a e^{-R_a^2/2s_a} \frac{\sinh(R_a \|x-a\|/s_a)}{R_a \|x-u\|/s_a}$$

The multiplicative constants of equation (4) may be ignored in this application to facilitate computation.

Combining the variances as $s_a = \sigma_u^2 t + \sigma_a^2$ allows the sum of the combined variance for each range measurement to be given as:

$$\frac{1}{s} = \sum_a \frac{1}{s_a} \tag{5}$$

Thus, the weighted mean of the access point locations with respect to the weights $1/s_a$ may be represented as:

$$\langle a \rangle = s \sum_a \frac{a}{s_a} \tag{6}$$

Further, by setting the non-normalized expectation value to:

$$E[f] = \int f(x) p(x) dx \tag{7}$$

then the expectation value corresponding to the position of client device 104 is:

$$\text{pos} = E[x]/E[1], \tag{8}$$

and the variance is given by:

$$\text{var} = E[x \cdot x^T]/E[1] - \text{pos} \cdot \text{pos}^T. \tag{9}$$

Although the above embodiment is discussed with respect to the use of Gaussian probability distributions, other probability density functions can be used as desired. An advantage of the techniques of this disclosure is the ability to tailor the specific models used to match anticipated noise conditions and uncertainty factors by selecting the appropriate probability density function.

In the discussion above with respect to step 214, performing an integration of the combined probability density functions results in the expected position pos of client device 104 and the variance var of the estimation. This solution is obtained by calculating the integrals $E[1]$, $E[x]$ and $E[x \cdot x^T]$.

Since the probability density p(x) decays rapidly, a suitable integration can be performed over a bounded space around the access points 102. Thus, in one embodiment, the integration is a lattice point integration, using an array of regularly spaced points in the appropriate number of dimensions for the desired application. For a three dimensional position determination, this array may be defined as a cube centered on the access points 102.

To perform the integration, a cube C a centered at access point 102 such that solutions to the function $p(a, R, \sigma_u^2, \sigma_a^2; x, t)$ are sufficiently small outside the cube. As will be appreciated, the appropriate size of the cube depends on the measured ranges, measurement delays, the assumed variances, desired accuracy, computational resources available and the like. In a currently preferred embodiment, edge length $e_a$ of the cube is given by:

$$e_a = 2(R_a + m \cdot \sqrt{s_a} + c) \tag{10}$$

wherein optional parameters m and c satisfy the conditions $m \geq 3$ and $c \geq 0$. A larger value for $e_a$ yields higher accuracy at the expense of increased computational overhead.

The domain of the integrations is chosen to be the intersection of the cubes:

$$e = \bigcap_a e_a \tag{11}$$

When the errors of the access point location and range are large, the intersection defined by equation (11) may be empty, requiring an increase in the parameter c. Although increasing c degrades the accuracy of the expectation value computation, the variance will still provide an indication as to whether the fix is sufficient for the intended application.

Given these conditions, a solution for the integrals can be approximated using the finite sums:

$$E[f] = \int f(x)p(x)dx \quad (12)$$

$$\approx \sum_{X \in \Lambda \cap e} f(x)p(x)$$

where $\Lambda$ is a lattice in three dimensional space. Accuracy of the estimation may be adjusted by choice of lattice spacing. In one embodiment, a cubic lattice with lattice constant d=0.5 m may be used and provides acceptable results in simulations. Since the choice of the integration domain is adaptive, the computation time needed for a fix varies.

An alternative to lattice point integration involves the use of Gauss-Hermite quadrature as suggested by the Gaussian factor in the integrand. The approach results in the calculation of integrals of the form:

$$E[f] = \int f(x)p(x)dx \quad (13)$$

$$= \int f(x)g(x)\mathcal{N}(\langle a \rangle, s; x)dx$$

where $$g(x) = \prod_a e^{-R_a^2/2s_a} \frac{\sinh(R_a\|x-a\|/s_a)}{R_a\|x-a\|/s_a}. \quad (14)$$

An affine change of variables employs the linear transformation $$x = \sqrt{2s}\, z + \langle a \rangle \quad (15)$$

and using the notation:

$$\tilde{f}(z) = f(\sqrt{2s}\, z + \langle a \rangle)$$

allows the expectation value integrals to be expressed as:

$$E[f] \propto \int \tilde{f}(z)\tilde{g}(z)e^{-z^2}dz \quad (17)$$

$$= \sum_k \tilde{f}(z_k)\tilde{g}(z_k)v_k.$$

wherein the nodes $z_k$ and weights $v_k$ may be selected by following the general Gaussian quadrature theory, for a fixed positive integer n, k=(i,j,l) with multi-indicies i,j,l=1, ..., n, by setting node $z_k = (x_i, x_j, x_l)$ where $x_i$ is the ith root of the nth Legendre polynomial $P_n$ and by setting weight $v_k = w_i w_j w_l$ where $$w_i = \frac{2}{(1-x_i^2)[P_n'(x_i)]^2}. \quad (18)$$

The values for the Gauss-Hermite nodes and weights can be calculated beforehand. Hence the computational cost of the algorithm is $Cn^3$ where the constant C measures the effort spent on evaluating the function $\tilde{f}(z)\tilde{g}(z)$ at a single node. Accordingly, the choice of n represents a trade-off between computational cost and accuracy.

By performing step 212 using Gauss-Hermite quadrature, good accuracy around the weighted average $\langle a \rangle$ of the access points 102 but the accuracy is reduced as the distance from the access points increases. Accordingly, the choice between lattice point integration and Gauss-Hermite quadrature may be made depending upon the expected conditions and applications. Similarly, other suitable integration methods may be employed as desired.

As noted above with regard to step 202, the ranges may be obtained from the network 100 using RTT measurements. As known to those of skill in the art, the RTT may be used to determine a one-way time-of-flight (TOF) for a signal transmitted between access point 102 and client device 104 from a known turn-around time and by assuming symmetrical channel conditions. Multiplying TOF by the speed of light gives the distance between the nodes. However, any other electromagnetic range measurement capability may also be used. As desired, the range measurement calculations may be performed by probabilistic positioning engine 108 or may be computed using other resources present in network 100.

RTT measurements are presently preferred due to timing advantages. In contrast to conventional TOA and TDOA techniques, the RTT measurement is performed using the clock of a single device, avoiding the difficult or costly requirement of clock synchronization between the nodes being measured. In general, a specific signal sent by the initiating node is automatically returned by the destination node, allowing RTT to be calculated by the difference in time between the start of the signal at the initiating node and the receipt of the return signal.

Necessarily, RTT techniques require a means for accurately estimating the delay imparted at the destination node. However, many wireless network implementations provide sufficient reproducibility to make the necessary determinations. Accordingly, it is preferable to use a signal that is received and returned by the destination node using operations occurring at the hardware level, such as the physical (PHY) layer or the media access control (MAC) layer, rather than software operations that are subject to a much greater degree of variability, such as those occurring in the application layer. Thus, in WLAN implementations, for example, the timing information necessary to perform RTT measurements may be provided by the hardware and will be available to position server 106 through network 100.

To illustrate the application of the probabilistic density algorithms of this disclosure, an example involving three access points 102 will be discussed with regard to determining the expectation value corresponding to the position of client device 104 and the associated variance. To focus on selected aspects of the algorithm, the example is artificially simplified to involve simultaneous range measurements applied in two dimensional space. Further, client device 104 is modeled as being static in this example so that the process noise variances $\sigma_u^2$ are not involved.

Figure 3:
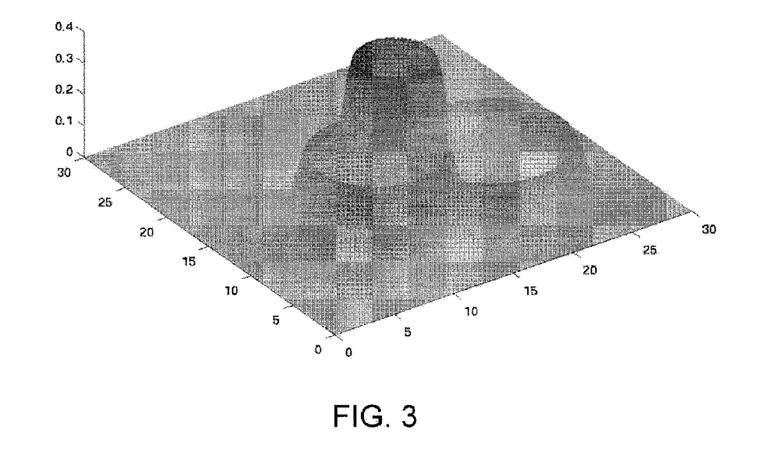
FIG. 3 is graphical representation of three single range measurement probability density functions, according to the invention.

Following steps 202 and 204, the retrieved access point 102 locations are the points $a_1=(12,12)$, $a_2=(17,17)$, and $a_3=(20, 10)$, and the corresponding measured ranges are $R_1=5$, $R_2=3$, and $R_3=6$. Since the range measurements are simultaneous, there are no time delays t. By setting the access point location variances $\sigma_a^2$ to 0.5, the three single range probability functions result in a solution graphically depicted by the three raised rings shown in FIG. 3. The product of these single range probability functions is the combined probability function having the solution graphically represented in FIG. 4. The expectation value, corresponding to the position estimate of client device 104 is pos=(16.2, 14.5) and the variance is $$\mathrm{var} = \begin{bmatrix} 0.44 & -0.05 \\ -0.05 & 0.33 \end{bmatrix}.$$

Figure 4:
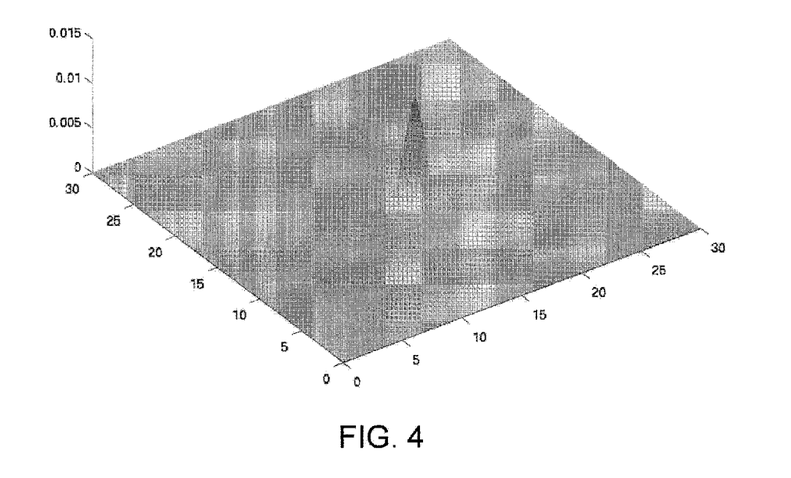
FIG. 4 is graphical representation of a combined range measurement probability density function, according to the invention.

As discussed above, the small values of the variance matrix reflect the fact that the product density function shown in FIG. 4 is sharply peaked and indicates relatively little uncertainty about the position determination regarding client device 104. Accordingly, by setting a suitable threshold for the values of var, the position determinations provided by these techniques may readily be classified as sufficiently accurate or not.

Described herein are presently preferred embodiments. However, one skilled in the art that pertains to the present invention will understand that the principles of this disclosure can be extended easily with appropriate modifications to other applications.

What is claimed is:

1. A method for making a position determination for a first network node within a wireless network comprising:
   obtaining position information for a plurality of network nodes, each having a known location;
   obtaining range measurements for distances between the first network node and the plurality of network nodes having known location;
   determining a single range measurement probability density function for a position of the first network node for each of the range measurements, wherein each single range measurement probability density function models a process noise uncertainty factor corresponding to movement of the first network node over time;
   determining a combined probability density function by taking a product of each of the single range measurement probability density functions; and
   determining an expectation value corresponding to a position of the first network node and a variance of the expectation value by integrating with respect to the combined probability density function.

2. The method of claim 1, wherein determining a single range measurement probability density function for a position of the first network node for each of the range measurements further comprises modeling an uncertainty factor selected from the group consisting of network node location error and range measurement error.

3. The method of claim 2, wherein determining a single range measurement probability density function for a position of the first network node for each of the range measurements comprises modeling uncertainty factors for process noise and network node location error.

4. The method of claim 3, wherein each of the single probability density functions modeling uncertainty factors for process noise and network node location error comprise a Gaussian distribution.

5. The method of claim 1, wherein integrating with respect to the combined probability density function comprises performing a lattice point integration.

6. The method of claim 1, wherein integrating with respect to the combined probability density function comprises performing a Gauss-Hermite quadrature calculation.

7. The method of claim 1, further comprising assessing the variance of the expectation value to determine validity of the position determination for the first network node.

8. The method of claim 1, wherein obtaining range measurements for distances between the first network node and the plurality of known network nodes comprises performing a round trip time calculation.

9. The method of claim 1, wherein obtaining range measurements for distances between the first network node and the plurality of network nodes having known location comprises taking at least one non-simultaneous measurement.

10. The method of claim 1, further comprising supplementing a position determination derived from the expectation value with position information from an independent source.

11. A wireless network having position determination capabilities comprising a first network node, a plurality of network nodes having known location and a probabilistic positioning engine processor configured to:
   obtain position information for a plurality of network nodes, each having a known location;
   obtain range measurements for distances between the first network node and the plurality of network nodes having a known location;
   determine a single range measurement probability density function for a position of the first network node for each of the range measurements, wherein each single range measurement probability density function models a process noise uncertainty factor corresponding to movement of the first network node over time;
   determine a combined probability density function by taking a product of each of the single range measurement probability density functions; and
   calculate an expectation value corresponding to a position of the first network node and a variance of the expectation value by integrating with respect to the combined probability density function.

12. The wireless network of claim 11, wherein the probabilistic positioning engine processor is further configured to determine a single range measurement probability density function for a position of the first network node for each of the range measurements by modeling an uncertainty factor selected from the group consisting of network node location error and range measurement error.

13. The wireless network of claim 12, wherein the probabilistic positioning engine processor is configured to determine a single range measurement probability density function for a position of the first network node for each of the range measurements by modeling uncertainty factors for process noise and network node location error.

14. The wireless network of claim 13, wherein the probability density functions modeling uncertainty factors for process noise network node location error comprise a Gaussian distribution.

15. The wireless network of claim 11, wherein the probabilistic positioning engine processor is configured to integrate with respect to the combined probability density function by performing a lattice point integration.

16. The wireless network of claim 11, wherein the probabilistic positioning engine processor is configured to integrate with respect to the combined probability density function by performing a Gauss-Hermite quadrature calculation.

17. The wireless network of claim 11, wherein the probabilistic positioning engine processor is further configured to assess the variance of the expectation value to determine a validity of the position determination for the first network node.

18. The wireless network of claim 11, wherein the probabilistic positioning engine processor is configured to obtain range measurements for distances between the first network node and the plurality of network nodes having known location by performing a round trip time calculation.

19. The wireless network of claim 11, wherein the probabilistic positioning engine processor is configured to obtain range measurements for distances between the first network node and the plurality of network nodes having known location by taking at least one non-simultaneous measurement.

20. The wireless network of claim 11, wherein the probabilistic positioning engine processor is further configured to supplement a position determination derived from the expectation value with position information from an independent source.

* * * * *